(12) United States Patent
Pontén

(10) Patent No.: US 12,242,590 B2
(45) Date of Patent: *Mar. 4, 2025

(54) SYSTEM AND METHOD FOR IDENTIFYING AND AUTHENTICATING COUNTERFEITING ARTICLES

(71) Applicant: Blue Cromos Management AB, Malmö (SE)

(72) Inventor: Fredrik Pontén, Bunkeflostrand (SE)

(73) Assignee: Blue Cromos Management AB, Malmö (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/341,596

(22) Filed: Jun. 26, 2023

(65) Prior Publication Data

US 2023/0418927 A1 Dec. 28, 2023

Related U.S. Application Data

(63) Continuation of application No. 16/660,864, filed on Oct. 23, 2019, now Pat. No. 11,687,642.

(51) Int. Cl.
| | |
|---|---|
| *G06F 21/00* | (2013.01) |
| *G06F 21/44* | (2013.01) |
| *G06V 10/75* | (2022.01) |
| *G06V 20/80* | (2022.01) |
| *G06V 30/224* | (2022.01) |

(52) U.S. Cl.
CPC ............ *G06F 21/44* (2013.01); *G06V 10/75* (2022.01); *G06V 20/80* (2022.01); *G06V 30/224* (2022.01)

(58) Field of Classification Search
CPC ....... G06F 21/44; G06V 10/75; G06V 30/224
See application file for complete search history.

(56) References Cited

U.S. PATENT DOCUMENTS

| | | |
|---|---|---|
| 6,944,773 B1 | 9/2005 | Abrahams |
| 9,367,770 B2 | 6/2016 | Footen |
| 10,019,646 B2 | 7/2018 | Voloshynovskiy et al. |
| 10,839,528 B2 * | 11/2020 | Ross ...................... G06T 7/292 |
| 2017/0140509 A1 * | 5/2017 | Lee ........................... G06T 5/50 |
| 2018/0129903 A1 * | 5/2018 | Stieglitz ................ G06F 16/958 |
| 2018/0260992 A1 * | 9/2018 | Roberts .................. G06T 19/00 |
| 2020/0265329 A1 * | 8/2020 | Thomsen ............. G05B 13/044 |

(Continued)

*Primary Examiner* — Rodman Alexander Mahmoudi
(74) *Attorney, Agent, or Firm* — Capitol City TechLaw

(57) ABSTRACT

A system and method for identifying and authenticating a counterfeit article using digital fingerprints are disclosed. The system comprises a server with a processor and memory, and a database. The memory is configured to store a set of modules executable by the processor. The set of modules include, but not limited to, a digital image acquisition module, a comparison module, and a decision module. The digital image acquisition module is configured to extract analog identification indicium of the article from one or more images. The comparison module is configured to compare analog identification indicium with actual analog identification indicium of the article. The decision module detects the authenticity of the article based on the comparison results. The system further comprises an anti-counterfeiting network verification system in communication with the server, configured to securely protect the actual analog identification indicium of the article from unauthorized access and other potential crimes.

16 Claims, 18 Drawing Sheets

(56) References Cited

U.S. PATENT DOCUMENTS

2020/0349379 A1* 11/2020 Ross .................... G06V 10/993
2022/0070006 A1*  3/2022 Jetzfellner ............ H04L 9/3236
2022/0334572 A1* 10/2022 Hanniman ....... G05B 19/41885

* cited by examiner

SYSTEM AND METHOD FOR IDENTIFYING AND AUTHENTICATING COUNTERFEITING ARTICLES

This application s a continuation of U.S. patent application Ser. No. 16/660,864 filed Oct. 23, 2019, the entire contents of which are incorporated herein by reference.

BACKGROUND OF THE INVENTION

A. Technical Field

The present invention generally relates to a system and method for identifying and authenticating counterfeit articles using digital fingerprints. More specifically, the present invention relates to a method for identifying and authenticating counterfeit articles include, but not limited to, luxurious goods and items, packages, wrappings, medtech products, pharmaceutical drugs, automobile parts, electronic gadgets and products, electronic components and parts, pesticides, children's toys, and thereof using digital fingerprints.

B. Description of Related Art

Counterfeit articles/goods are fakes or unauthorized replicas of the real products. Counterfeit goods such as pharmaceutical and cosmetics products, electronics, luxury watches, text documents, and certificates are often produced with the intent to take advantage of the superior value of the imitated product and offered for sale. The spread of counterfeit goods has become global in recent years and the range of goods subject to infringement has increased significantly.

Counterfeiting of manufactured goods is a worldwide problem, with recent studies estimating that the manufacturing and sales of counterfeit goods are significantly increased all over the world. Counterfeit goods tend to have fake company logos and brands. Despite numerous efforts from brand owners and manufacturers, the end-consumers are not well aware, respectively cannot be well aware of the particularities of the original design of a given product or content which is often changed for various commercial and technical reasons. Further, the counterfeit products are risks to public health due to a lack of quality and standards. The counterfeit products include counterfeit pharmaceutical drugs, automobile parts, electronic gadgets and products, pesticides, children's toys, and thereof. In addition, counterfeit computer chips, aerospace parts, and identification documents present significant risks to national security. The counterfeit products are often poorly made, do not comply with safety standards and could be potentially lethal. However, there is a need to detect and authenticate counterfeit goods.

A prior art U.S. Pat. No. 9,367,770 to Marc G. Footen, describes about a method for identifying items, e.g., by a supermarket checkout system. A first camera arrangement captures first 2D image data depicting the item when it is at a first position along the path and second 2D image data is captured when the item is at a second position along the path. A programmed computer, or other devices, processes the captured image data in conjunction with geometrical information about the path and the camera to discern 3D spatial orientation information for a first patch on the item. By reference to this 3D spatial orientation information, the system determines object-identifying information from the camera's depiction of at least the first patch. The object-identifying information can be a machine-readable identifier, such as a barcode or a steganographic digital watermark, either of which can convey a plural-bit payload. The product can be identified by other markings, such as by image fingerprint information that is matched to reference fingerprint information in a product database.

Another prior art U.S. Ser. No. 10/019,646 to Voloshynovskiy et al., describes about a method for recognition and/or verification of the authenticity of digital, and/or physical objects, comprising the steps of codebook training, object enrollment, and object verification, the latter consisting in object recognition and/or object authentication. The method uses two types of features, codebooks, and databases, which are specifically designed for identification, respectively authentication, the identification database and authentication database having different organizations. The invention is also directed to corresponding computer program means adapted to implement the proposed method, devices adapted for implementation of a method, as well as to applications which are particularly adapted for use of the proposed method.

However, conventional systems and methods are inefficient to detect and counterfeit goods, inconvenient operation, and expensive. The conventional systems require additional equipment for assembling that increases installation cost. Further, the conventional systems and methods are complex.

Therefore, there is a need to provide a system and method for efficiently detecting and authenticating counterfeit goods. Further, there is also a need to provide an inexpensive and secure system and method for efficiently detecting and authenticating counterfeit goods.

SUMMARY OF THE INVENTION

The present invention discloses a system and method for identifying and authenticating counterfeit articles using digital fingerprints. Further, the present invention discloses a system and method for identifying and authenticating counterfeit articles include, but not limited to, packages, pharmaceutical drugs, automobile parts, electronic gadgets and products, pesticides, children's toys, and thereof using digital fingerprints.

In one embodiment, the system used for identifying and authenticating a counterfeit article using digital fingerprints is disclosed. In one embodiment, the system is configured to identify and authenticate a counterfeit article, includes, but not limited to, pharmaceutical drugs, automobile parts, electronic gadgets and products, pesticides, children's toys, and thereof. In one embodiment, the system comprises a server with a processor and a memory. In one embodiment, the memory is in communication with the processor. The memory is configured to store a set of modules executable by the processor. In one embodiment, the system further comprises a database. The database in communication with the server is configured to store actual analog identification indicium of the articles. The actual analog identification indicium includes a randomized pattern of reference features/authentication features of the article. In one embodiment, the actual analog identification indicium corresponding to the article is identified by reading and decoding digital identifier data and a digital identification record of the article. In one embodiment, the database is further configured to store digital identifier data and digital identification record of the article.

In one embodiment, the set of modules includes, but not limited to, a digital image acquisition module, a comparison module, and a decision module. In one embodiment, the digital image acquisition module is configured to extract analog identification indicium of the article from one or more images. In one embodiment, the comparison module is configured to compare analog identification indicium with actual analog identification indicium of the article. In one embodiment, the analog identification indicium comprises feature information and position information of one or more features of the article. The feature information includes, but not limited to, images, labels, stickers, package corners, printings, text fields, symbols, embossment, geometric feature, punched holes, surfaces, quick reader (QR) codes/data matrix codes (DMC)/zebra barcodes, corners, and angles. In one embodiment, the comparison module comprises mathematical models for efficiently authenticating the counterfeit article.

In one embodiment, the images of the article are captured by a user using a portable electronic device and sent to the server of the system via, but not limited to, a communication network. In one embodiment, the portable electronic device is at least any one of, but not limited to, a smart phone, a personal digital assistant (PDA), a notebook, a laptop, a tablet, and a remote controlling device. In one embodiment, the communication network is at least any one of, but not limited to, Wi-Fi, Bluetooth®, a local area network (LAN), a wireless local area network (WLAN), a cellular network, and radio communication.

In one embodiment, the decision module is configured to determine the authenticity of the article. In one embodiment, the article could be, but not limited to, packages, pharmaceutical drugs, automobile parts, electronic gadgets and products, pesticides, children's toys, and thereof. In one embodiment, the system further comprises an anti-counterfeiting network verification system. In one embodiment, the anti-counterfeiting network verification system in communication with the server is configured to securely protect the actual analog identification indicium of the article from unauthorized access and other potential crimes.

In one embodiment, a method for identifying and authenticating a counterfeit article using digital fingerprints is disclosed. At one step, the analog identification indicium is extracted from images of an article using the digital image acquisition module, wherein the analog identification indicium comprises feature information and position information of one or more features of the article. The images of the article are captured by a user using a portable electronic device, for example, a smart phone, and sent to the server of the system via a communication network. In one embodiment, the communication network is at least any one of, but not limited to, Wi-Fi, Bluetooth®, a local area network (LAN), a local area network (LAN), a wireless local area network (WLAN), a cellular network, and radio communication. At another step, the comparison module compares analog identification indicium with the actual analog identification indicium of the article. In one embodiment, the analog identification indicium comprises feature information and position information of one or more features of the article. In one embodiment, the actual analog identification indicium of the article is securely stored in the database. Further, at another step, the decision module detects the authenticity of the article based on the comparison results.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
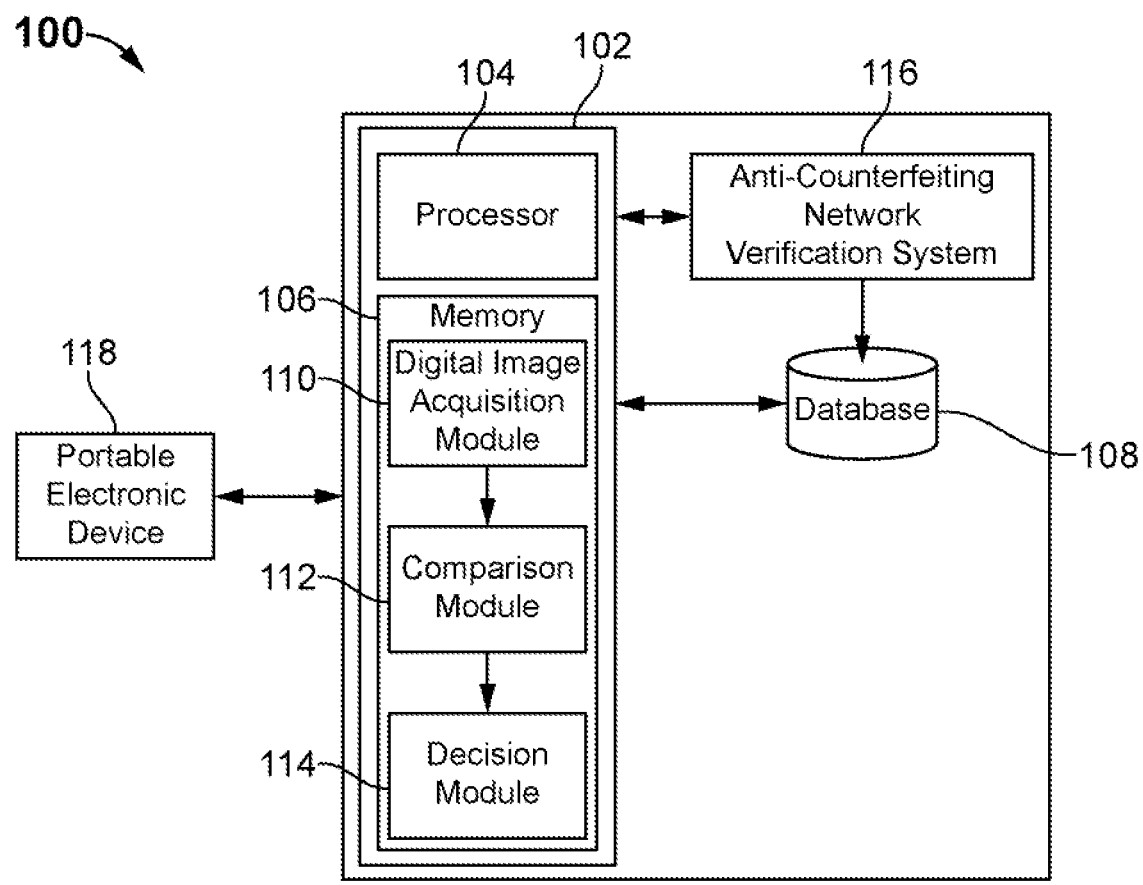
FIG. 1 shows a block diagram of an anti-counterfeiting system for identifying and authenticating a counterfeit article using digital fingerprints in an embodiment of the present invention.

Referring to FIG. 1, an anti-counterfeiting system 100 for identifying and authenticating a counterfeit article using digital fingerprints is disclosed. In one embodiment, the system 100 is configured to identify and authenticate a counterfeit article, includes, but not limited to, pharmaceutical drugs, automobile parts, electronic gadgets and products, pesticides, children's toys, and thereof. In one embodiment, the system 100 comprises a server 102 with a processor 104 and a memory 106. In one embodiment, the memory 106 is in communication with the processor 104.

The memory 106 is configured to store a set of modules executable by the processor 104. In one embodiment, the system 100 further comprises a database 108. The database 108 in communication with the server 102 is configured to store actual analog identification indicium of the articles. The actual analog identification indicium includes images with a randomized pattern of reference features/authentication features of the article. In one embodiment, the database 108 stores high resolution images that are linked to individual products as a digital twin. In one embodiment, the actual analog identification indicium corresponding to the article is identified by reading and decoding digital identifier data and a digital identification record of the article. In one embodiment, the database 108 is further configured to store digital identifier data and digital identification record of the article. In one embodiment, the present invention uses the fluctuation in the positioning of reference features and authentication features when they are added to a product at different occasions to identify product individuals for authenticating the article/product. During printouts or packaging, the system 100 could discover the difference in a structure on package or product. The system 100 could measure misalignment with high precision and thus determine authenticity with the ultimate degree of confidence. In one embodiment, the system 100 could capture and identify the region of interest (ROI) on the captured image and securely stored in the system's database 108 for later use. In one embodiment, the features of the article could be divided into 2 groups such as reference features and authentication features. The reference features with a stable offset among each other's and the authentication features are features where the offset varies in relation to reference features and possibly among each other's.

In one embodiment, the set of modules includes, but not limited to, a digital image acquisition module 110, a comparison module 112, and a decision module 114. In one embodiment, the digital image acquisition module 110 is configured to extract analog identification indicium of the article. In one embodiment, the comparison module 112 is configured to compare analog identification indicium with actual analog identification indicium of the article that is securely stored in the database 108. In one embodiment, the analog identification indicium comprises feature information and position information of one or more features of the article. The feature information includes, but not limited to, images, labels, stickers, package corners, printings, text fields, symbols, embossment, geometric feature, punched holes, surfaces, quick reader (QR) codes/data matrix codes (DMC)/zebra barcodes, corners, and angles. In one embodiment, the comparison module 112 comprises mathematical models for efficiently authenticating the counterfeit article.

In one embodiment, the images of the article are captured by a user using a portable electronic device 118 and sent to the server 102 of the system 100 via, but not limited to, a communication network. In one embodiment, the portable electronic device 118 is at least any one of, but not limited to, a smart phone, a personal digital assistant (PDA), a notebook, a laptop, a tablet, and a remote controlling device. In one embodiment, the communication network is at least any one of, but not limited to, Wi-Fi, Bluetooth®, a local area network (LAN), a local area network (LAN), a wireless local area network (WLAN), a cellular network, and radio communication.

In one embodiment, the decision module 114 is configured to determine the authenticity of the article. In one embodiment, the article could be, but not limited to, packages, pharmaceutical drugs, automobile parts, electronic gadgets and products, pesticides, children's toys, and thereof. In one embodiment, the system 100 further comprises an anti-counterfeiting network verification system 116. In one embodiment, the anti-counterfeiting network verification system 116 in communication with the server 102 is configured to securely protect the actual analog identification indicium of the article from unauthorized access and other potential crimes.

Figure 2:
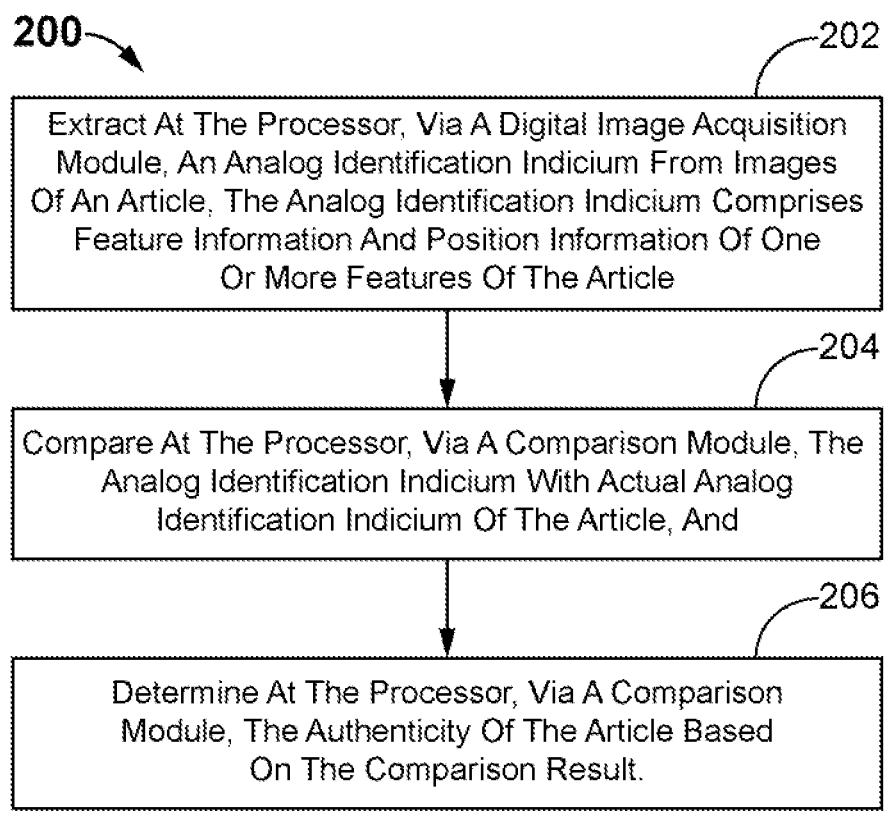
FIG. 2 shows a flowchart of a method for identifying and authenticating a counterfeit article using digital fingerprints in one embodiment of the present invention.

Referring to FIG. 2, a flowchart of a method 200 for identifying and authenticating a counterfeit article using digital fingerprints is disclosed. At step 202, the analog identification indicium is extracted from images of an article using the digital image acquisition module 110 (shown in FIG. 1), wherein the analog identification indicium comprises feature information and position information of one or more features of the article. The images of the article are captured by a user using a portable electronic device 118 (shown in FIG. 1), for example, a smart phone, and sent to the server 102 (shown in FIG. 1) of the system 100 (shown in FIG. 1) via a communication network. In one embodiment, the communication network is at least any one of, but not limited to, Wi-Fi, Bluetooth®, a local area network (LAN), a wireless local area network (WLAN), a cellular network, and radio communication. At step 204, the comparison module 112 (shown in FIG. 1) compares analog identification indicium with the actual analog identification indicium of the article. In one embodiment, the analog identification indicium comprises feature information and position information of one or more features of the article. In one embodiment, the actual analog identification indicium of the article is securely stored in the database 108 (shown in FIG. 1). Further, at step 206, the decision module 114 (shown in FIG. 1) detects the authenticity of the article based on the comparison result.

Figure 3:
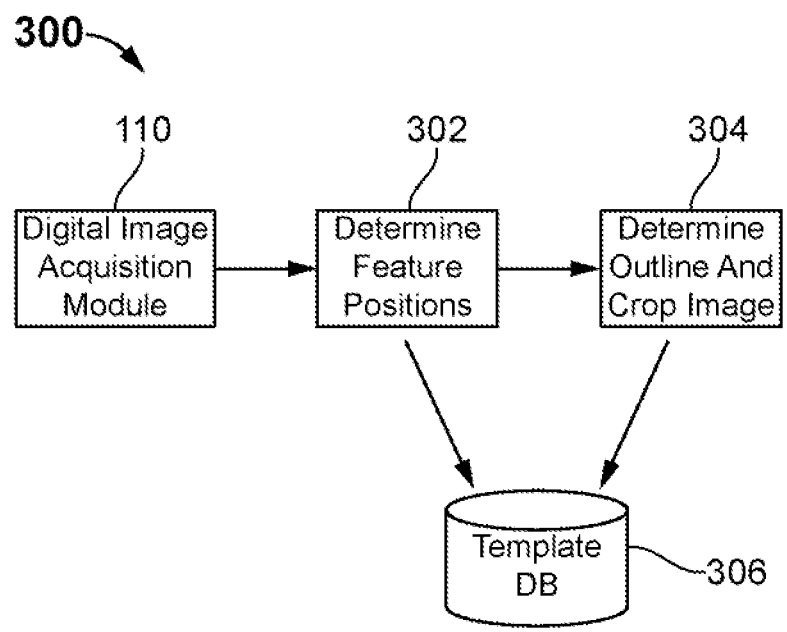
FIG. 3 shows a block diagram of a process for creating templates and storing in a template database in one embodiment of the present invention.

Referring to FIG. 3, discloses a block diagram 300 of a process for creating templates and storing in a template database 306 according to one embodiment of the present invention. In one embodiment, the digital image acquisition module 110 is configured to determine the feature positions of a product or an item. The process for creating templates includes different steps. At step 302, the digital image acquisition module 110 could capture one or more pictures of the product or item and determines one or more features of the product or item. In one embodiment, the digital image acquisition module 110 could determine and mark the region of interest (ROI) on the captured images. In one embodiment, the one or more features of the product or item could be stored in a template database 306. Further, at step 304, the digital image acquisition module 110 could determine the outline of the product or item and crop the images. In one embodiment, the cropped images could be stored in the template database 306.

In one embodiment, the template of the product is used for retrieving the features. There's only one template per product and it could include a typical image of the product, an array of ROT (region of interest) for location of identification features, an array of ROT for location of authentication features, an ROI for the location of the unique identifier (UID) and an outline for the product.

Figure 4:
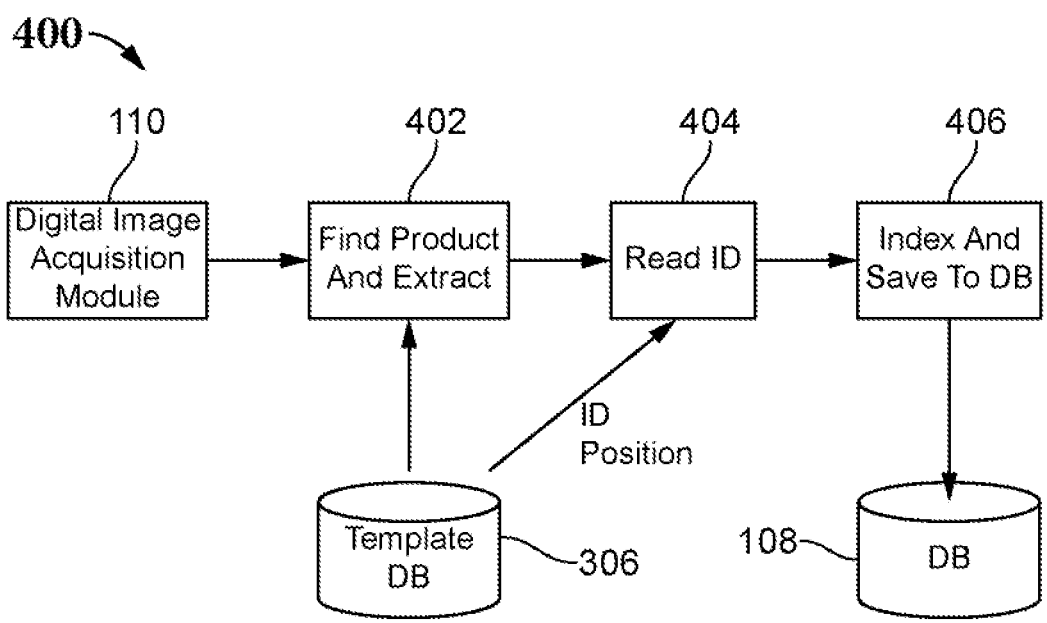
FIG. 4 shows a block diagram of a process for creating a digital twin of the product or item and storing it in a template database in one embodiment of the present invention.

Referring to FIG. 4, discloses a block diagram 400 of a process for creating a digital twin of the product or item and storing in a template database 306 according to one embodiment of the present invention. In one embodiment, the digital image acquisition module 110 is further configured to create the digital twin of the product. The process for creating the digital twin of the product includes different steps. At step 402, the digital image acquisition module 110 could find the product or item and outlines by retrieving templates from the template database 306 and extract a unique code or identification number (ID) of the product or item. In one embodiment, data includes images and ID of the product could be securely stored in the template database 306. At step 404, the digital image acquisition module 110 reads the identification number (TD)/serial number of the product or item. Further, at step 406, the images and identification number (ID)/serial number of the product or item are securely stored in the database 108 of the system 100. In one embodiment, the identification number/serial number could be stored in the database 108 as an index.

Figure 5:
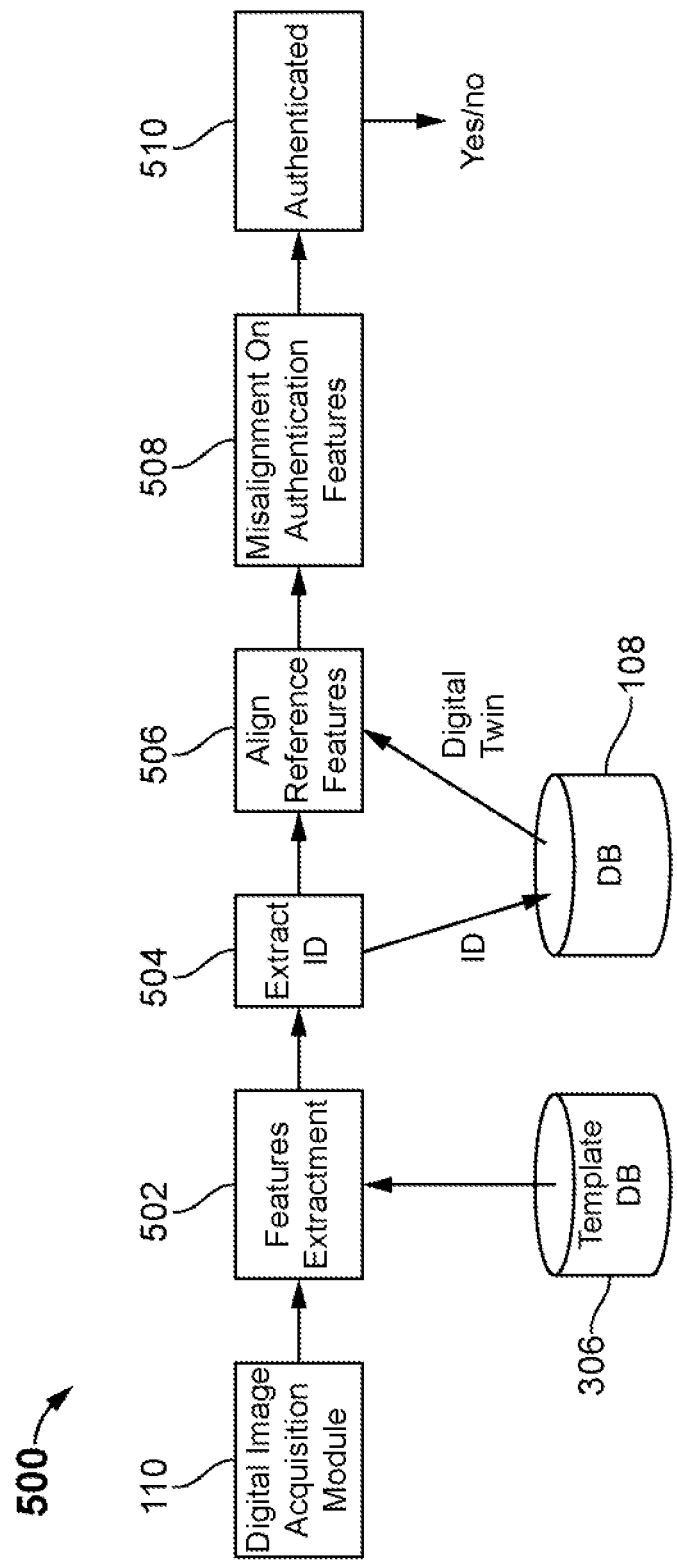
FIG. 5, shows a block diagram of a process for authenticating the article/product using the digital image acquisition module in one embodiment of the present invention.

Referring to FIG. 5, discloses a block diagram 500 of a process for authenticating the article/product or item using the digital image acquisition module 110 according to one embodiment of the present invention. At step 502, the digital image acquisition module 110 could extract one or more features and templates of the product or image from the template database 306. At step 504, the digital image acquisition module 110 extracts the unique identification number (UID)/serial number of the product or item and stores in the system's database 108. At step 506, the digital image acquisition module 110 could retrieve and align the reference features/digital twin for perspective and also adjust an image translation, scale, rotation, and thereof. In one embodiment, the digital image acquisition module 110 could measure and match images using the square image matching (LSM) for high matching accuracy. At step 508, the digital image acquisition module 110 extracts identification areas/authentication areas on both images and identify misalignments on authentication features. At step 510, the digital image acquisition module 110 could authenticate the product or item by comparing the one or more features and identifying areas/authentication areas on both images of the product or item.

Figure 6:
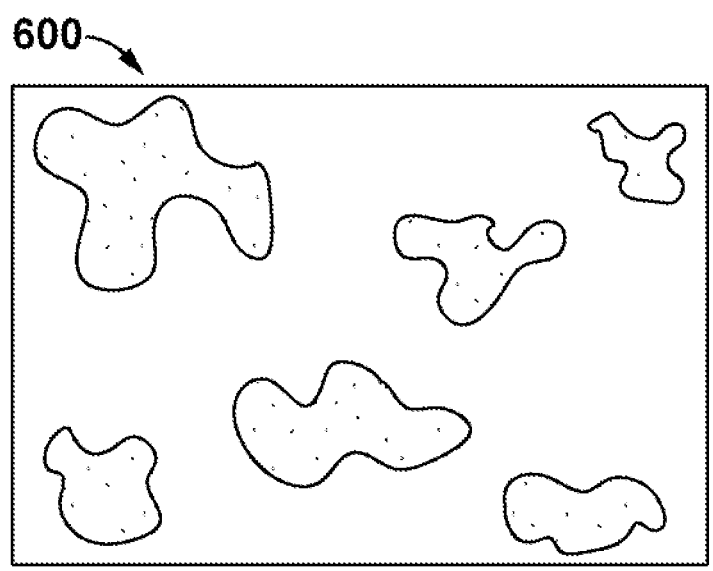
FIG. 6 shows a screenshot of a first feature group of an article in an exemplary embodiment of the present invention.

Referring to FIG. 6, a screenshot 600 of a first feature group of the article is disclosed. In one embodiment, the first feature group could be extracted from the one or more images taken by the user using the portable electronic device 118, for example, a smart phone. In one embodiment, the article could be, but not limited to, packages, pharmaceutical drugs, automobile parts, electronic gadgets and products, pesticides, children's toys, and thereof. In one embodiment, the first feature group could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles. In an exemplary embodiment, the first feature group includes a set of characteristic symbols/key features with a randomized pattern of reference features/authentication features of the article.

Figure 7:
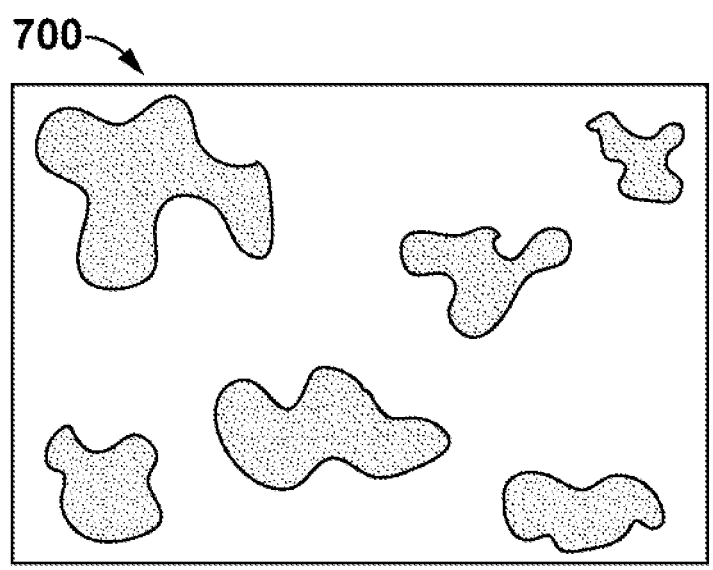
FIG. 7 shows a screenshot of a second feature group of the article in an exemplary embodiment of the present invention.

Referring to FIG. 7, a screenshot 700 of a second feature group of the article is disclosed. In one embodiment, the second feature group could be extracted from the database 108 of the system 100. In one embodiment, the database 108 securely stores the actual original images, features, and additional information including, but not limited to, air pressure, light conditions, position, distance and motive, date of production, country of origin, global trade identifier, batch number, serial number, etc. of the articles as a digital twin. In one embodiment, the second feature group could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles. In an exemplary embodiment, the second feature group includes a set of characteristic symbols/key features with a randomized pattern of reference features/authentication features of the corresponding article.

Figure 8:
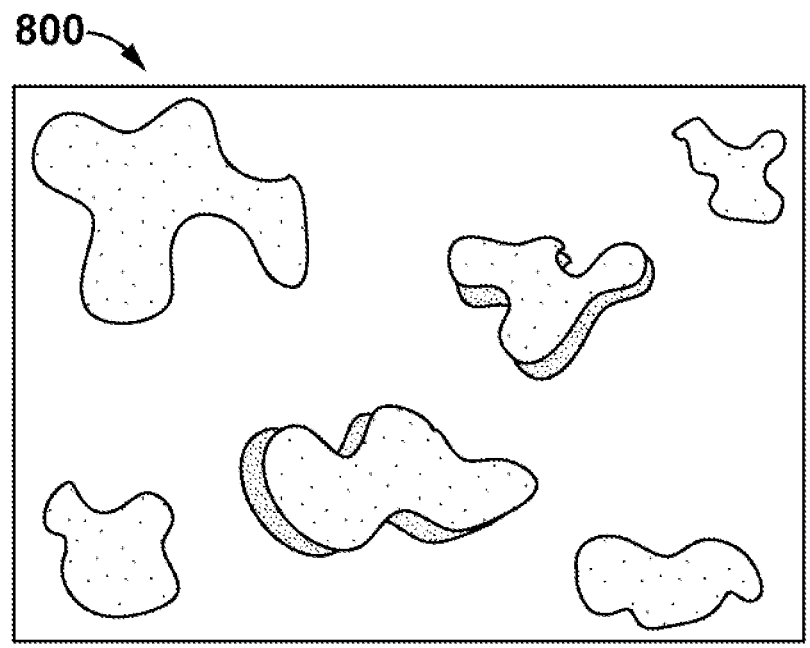
FIG. 8 shows a screenshot of the first feature group of the article overlapped on the second feature group for identifying and authenticating the counterfeit article in one embodiment of the present invention.

Referring to FIG. 8, the screenshot 800 of the first feature group of the article is overlapped on the second feature group for identifying and authenticating the counterfeit article is disclosed. In one embodiment, the first feature group of the article is overlaid on the second feature group of the corresponding article. The second feature group could be the actual analog identification indicium. In one embodiment, the comparison module 112 of the system 100 is configured to compare the first feature group of the article with the second feature group by overlapping each other, thereby efficiently identifying and authenticating the counterfeit articles based on the comparison result and variations/deviations in the offset within the limits using the mathematical models. The set of characteristic symbols/key features of the first feature group and associated to the corresponding set of characteristic symbols/key features of the second feature group are overlapped for identifying and authenticating the counterfeit articles.

Figure 9:
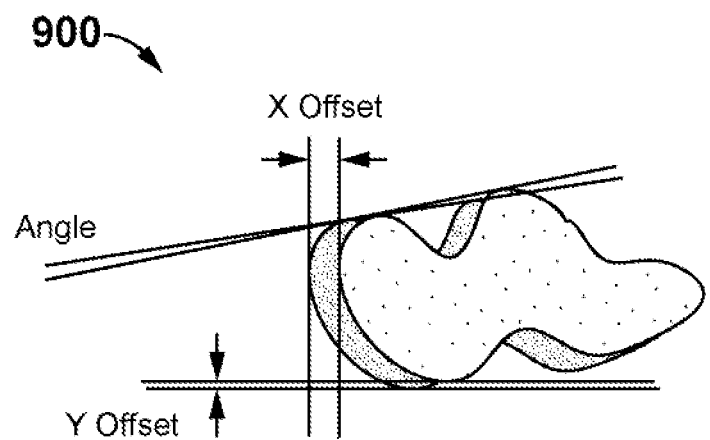
FIG. 9 shows a screenshot of the comparison results of the first feature and the second feature of the article using the mathematical models in one embodiment of the present invention.

Referring to FIG. 9, a screenshot 900 of the comparison results of the first feature and the second feature of the article using the mathematical models is disclosed. In one embodiment, the first feature and the second feature group of the article are compared using the comparison module 112 of the system 100 with the mathematical models. In one embodiment, the system 100 could determine the x coordinate and y coordinate values of points (X-offset and Y-offset values), scale and angle variations between each characteristic symbols/key features of the first feature and the second feature of the article by overlapping using the mathematical models, thereby efficiently identifying and authorizing the counterfeit articles using the system 100. The correction values are utilized by the processor 104 for detecting for identifying and authenticating a counterfeit article.

Figure 10:
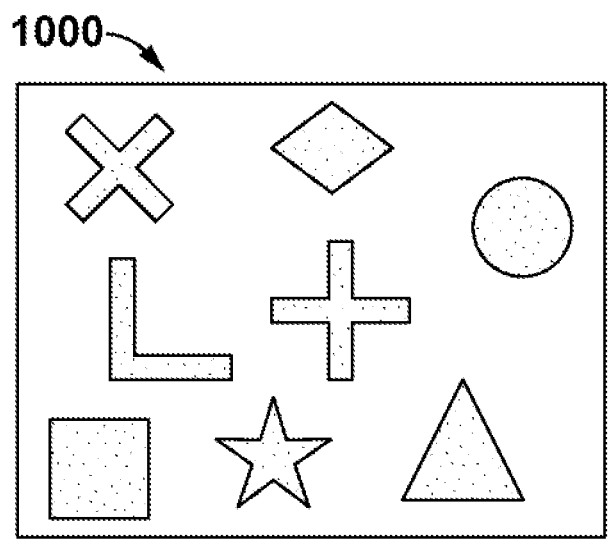
FIG. 10 shows a screen shot of a first feature group of an article in another embodiment of the present invention.

Referring to FIG. 10, a screenshot 1000 of a first feature group of the article is disclosed. In another embodiment, the first feature group could be extracted from the one or more images taken by the user using the portable electronic device 118, for example, a smart phone. In one embodiment, the article could be, but not limited to, packages, pharmaceutical drugs, automobile parts, electronic gadgets and products, pesticides, children's toys, and thereof. In another embodiment, the first feature group of the article could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles. In an exemplary embodiment, the first feature group of the article includes a set of characteristic symbols/key features includes, but not limited to, a cross symbol, a diamond symbol, a L-shaped symbol, a plus symbol, a cube symbol, a star symbol, and a triangle symbol with a randomized pattern of reference features/authentication features of the article.

Figure 11:
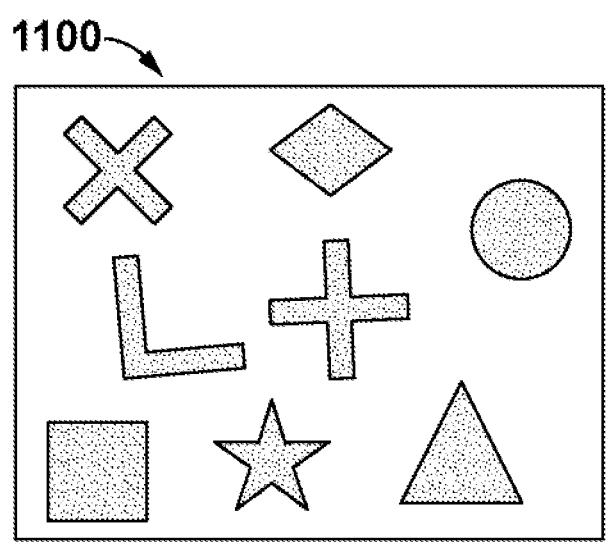
FIG. 11 shows a screenshot of a second feature group of the article in another embodiment of the present invention.

Referring to FIG. 11, a screenshot 1100 of a second feature group of the article is disclosed. In another embodiment, the second feature group of the article could be extracted from the database 108 of the system 100. In one embodiment, the database 108 securely stores the actual original images, features, and additional information of the articles as a digital twin. In one embodiment, the second feature group of the corresponding article could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles. In an exemplary embodiment, the second feature group of the article includes a set of characteristic symbols/key features includes, but not limited to, a cross symbol, a diamond symbol, a L-shaped symbol, a plus symbol, a cube symbol, a star symbol, and a triangle symbol with a randomized pattern of reference features/authentication features of the corresponding article.

Figure 12:
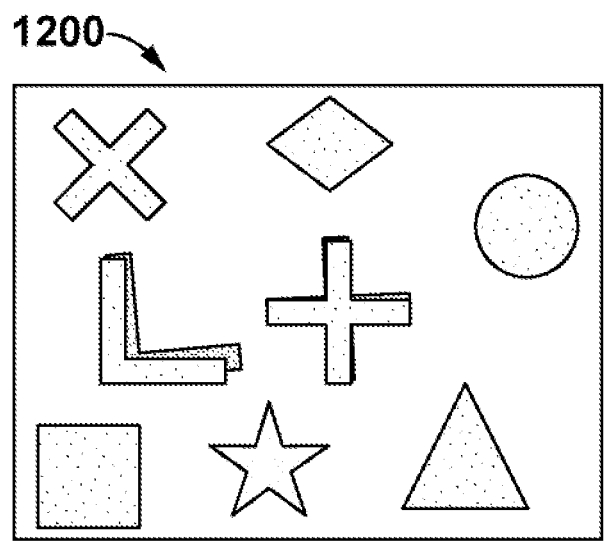
FIG. 12 shows a screenshot of the first feature group of the article overlapped on the second feature group for identifying and authenticating the counterfeit article in one embodiment of the present invention.

Referring to FIG. 12, the screenshot 1200 of the first feature group of the article is overlapped on the second feature group for identifying and authenticating the counterfeit article is disclosed. In one embodiment, the first feature group of the article is overlaid on the second feature group of the corresponding article. The second feature group could be the actual analog identification indicium. In one embodiment, the comparison module 112 of the system 100 is configured to compare the first feature group of the article with the second feature group by overlapping each other, thereby efficiently identifying and authenticating the counterfeit articles based on the comparison results and variations within the limits using the mathematical models. The set of characteristic symbols/key features of the first feature group and associated to the corresponding set of characteristic symbols/key features of the second feature group are overlapped for identifying and authenticating the counterfeit articles.

Figure 13:
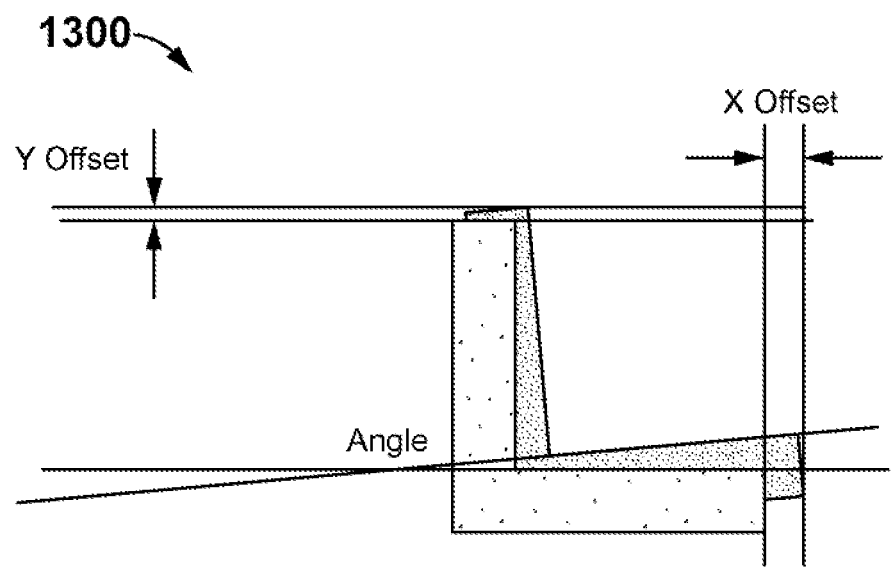
FIG. 13 shows a screenshot of the comparison results of the first feature and the second feature of the article using the mathematical models in one embodiment of the present invention.

Referring to FIG. 13, a screenshot 1300 of a comparison result of the first feature and the second feature of the article using the mathematical models is disclosed. In one embodiment, the first feature and the second feature of the article are compared using the comparison module 112 of the system 100 with the mathematical models. In one embodiment, the system 100 could determine the x coordinate and y coordinate values of points (X-offset and Y-offset values), scale and angle variations between each characterize symbols/key features of the first feature and the second feature of the article by overlapping using the mathematical models, thereby efficiently identifying and authorizing the counterfeit articles using the system 100. In an exemplary embodiment, the system 100 could determine the x coordinate and y coordinate values of points (X-offset and Y-offset values), scale and angle variations between the L-shaped characteristic symbol/key feature of the first feature and the second feature of the article. The correction values are utilized by the processor 104 for detecting for identifying and authenticating a counterfeit article.

Figure 14:
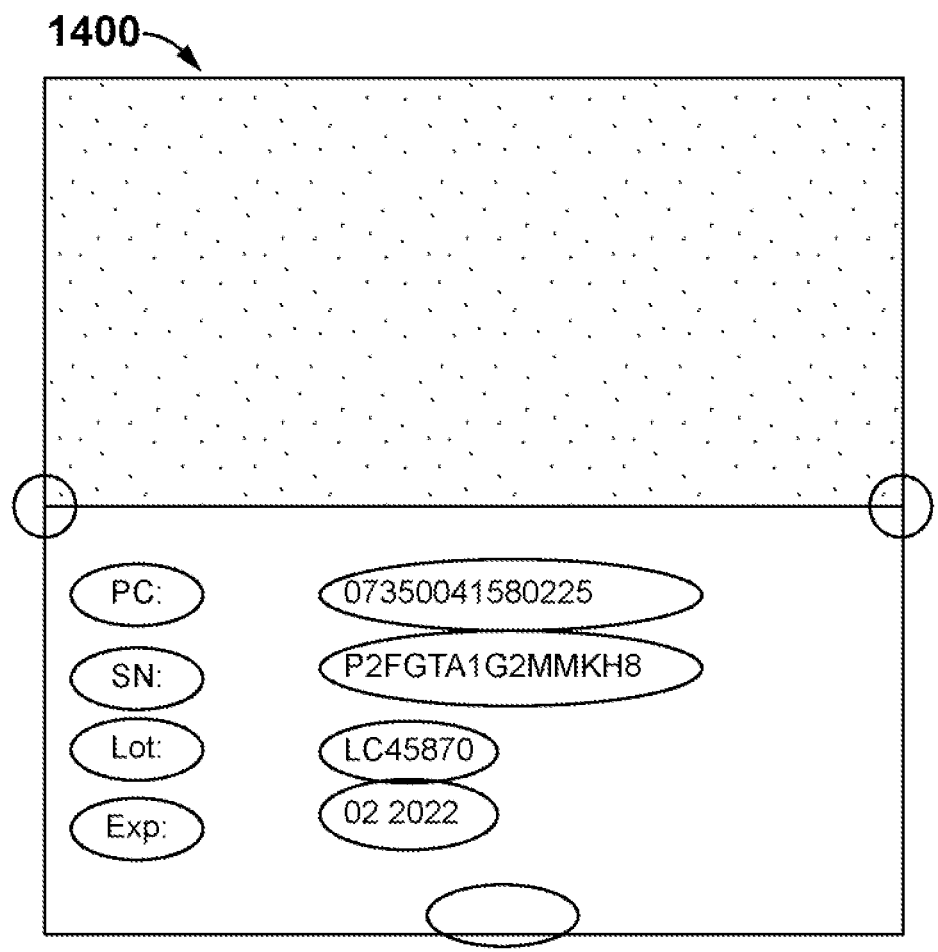
FIG. 14 shows a screenshot of a first feature group of a pharmaceutical product in an exemplary embodiment of the present invention.

Referring to FIG. 14, a screenshot 1400 of a first feature group of the article is disclosed. In one embodiment, the first feature group could be extracted from the one or more images taken by the user using the portable electronic device 118, for example, a smart phone. In one embodiment, the article could be, but not limited to, packages, pharmaceutical drugs, automobile parts, electronic gadgets and products, pesticides, children's toys, and thereof. In an exemplary embodiment, the article could be a pharmaceutical product. In one embodiment, the first feature group could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles. In an exemplary embodiment, the first feature group includes a set of characteristic symbols/key features include, but not limited to, text fields with a randomized pattern of reference features/authentication features of the article.

Figure 15:
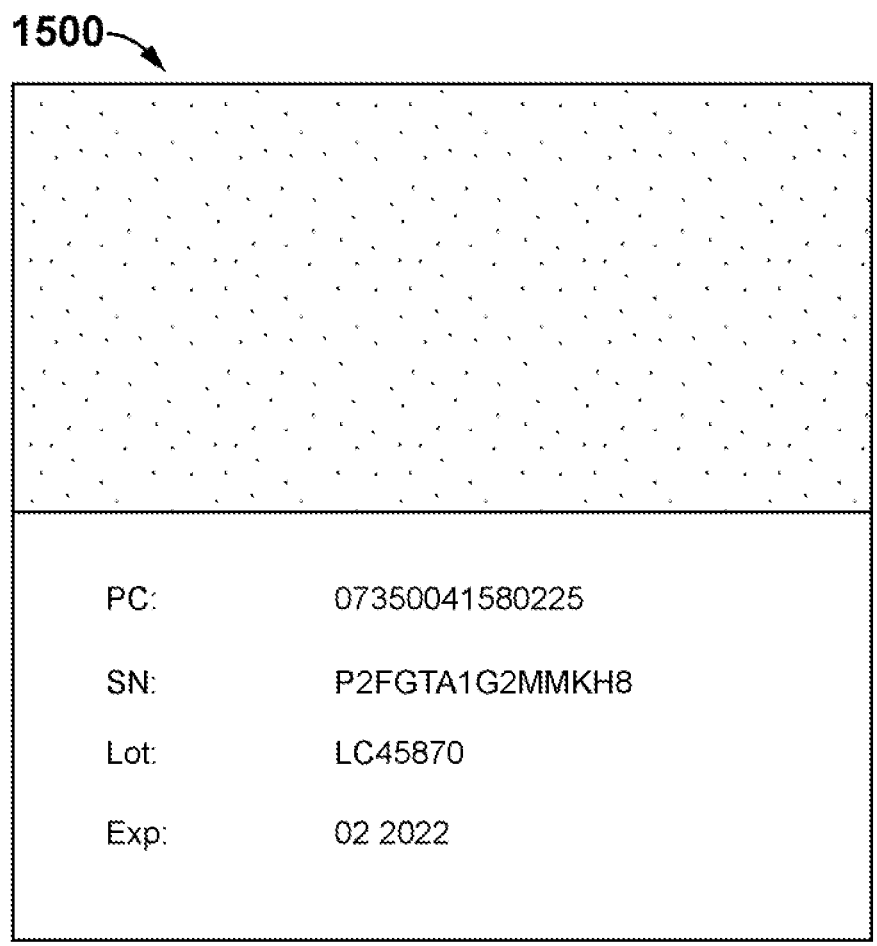
FIG. 15 shows a screenshot of a second feature group of the pharmaceutical product in an exemplary embodiment of the present invention.

Referring to FIG. 15, a screenshot 1500 of a second feature group of the corresponding article is disclosed. In another embodiment, the second feature group of the article could be extracted from the database 108 of the system 100. In one embodiment, the database 108 securely stores the actual original images, features, and additional information of the articles as a digital twin. In one embodiment, the second feature group of the corresponding article could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles. In an exemplary embodiment, the second feature group of the article includes a set of characteristic symbols/key features includes, but not limited to, text fields with a randomized pattern of reference features/authentication features of the corresponding article.

Figure 16:
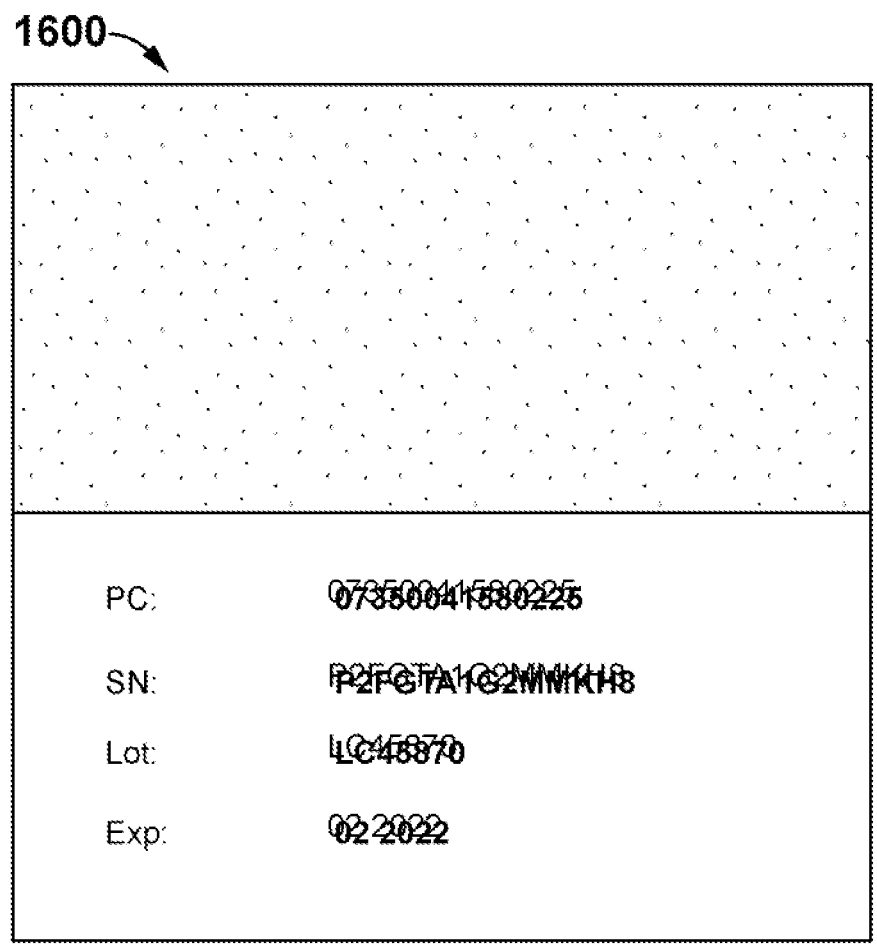
FIG. 16 shows a screenshot of the first feature group of the pharmaceutical product overlapped on the second feature group for identifying and authenticating the counterfeit article in one embodiment of the present invention.

Referring to FIG. 16, the screenshot 1600 of the first feature group of the article is overlapped on the second feature group for identifying and authenticating the counterfeit article is disclosed. In one embodiment, the first feature group of the article is overlaid on the second feature group of the corresponding article. The second feature group could be the actual analog identification indicium. In one embodiment, the comparison module 112 of the system 100 is configured to compare the first feature group of the article with the second feature group by overlapping each other, thereby efficiently identifying and authenticating the counterfeit article based on the comparison results and variations within the limits using the mathematical models. The set of characteristic symbols/key features, for example, text fields on the first feature group and associated to the corresponding set of characteristic symbols/key features, for example, text fields on the second feature group are overlapped for identifying and authenticating the counterfeit articles.

Figure 17A:
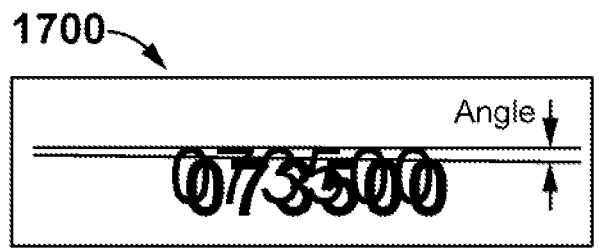
FIGS. 17A-17C show screenshots of comparison results of the first feature and the second feature of the pharmaceutical product using the mathematical models in one embodiment of the present invention.
Figure 17B:
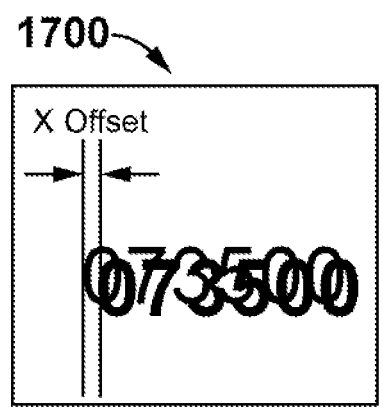
Figure 17C:
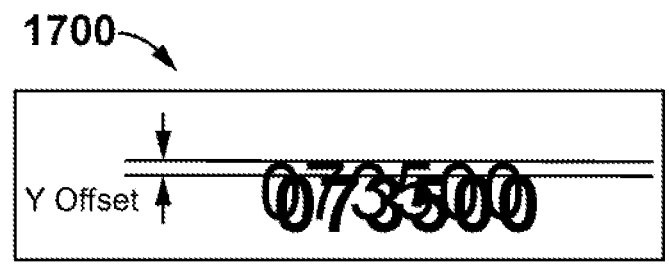
Figure 18:
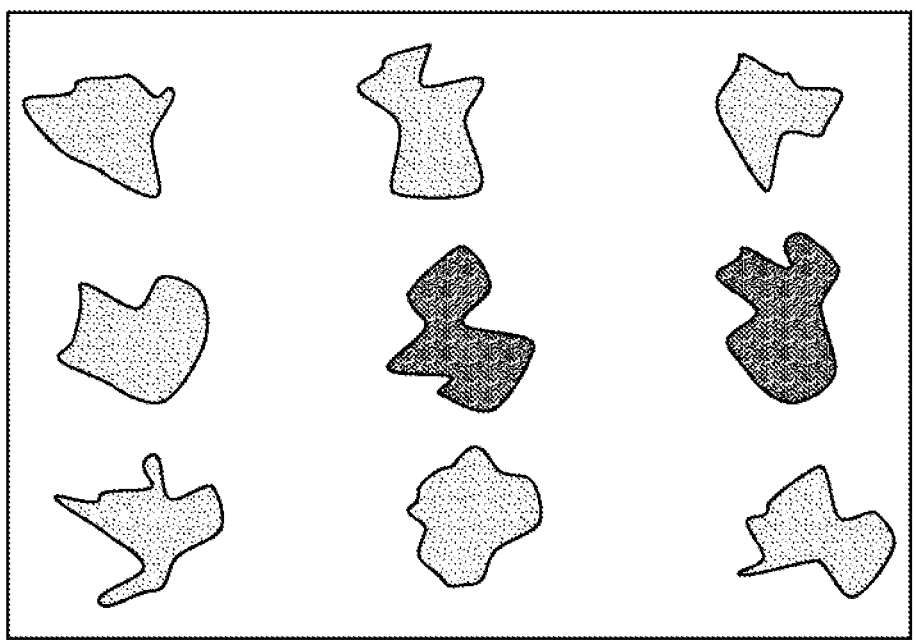
FIG. 18 shows a screenshot of a first feature group of an article in yet another embodiment of the present invention.

Referring to FIGS. 17A-17C, screenshots 1700 of comparison results of the first feature and the second feature of the article using the mathematical models is disclosed. In one embodiment, the first feature and the second feature of the article, for example, pharmaceutical products, are compared using the comparison module 112 of the system 100 with the mathematical models. In one embodiment, the system 100 could determine the x coordinate and y coordinate values of points (X-offset and Y-offset values), scale and angle variations between each characterize symbols/key features, for example, text fields of the first feature and the second feature of the article, for example, a pharmaceutical product by overlapping using the mathematical models, thereby efficiently identifying and authorizing the counterfeit articles using the system 100. In an exemplary embodiment, the system 100 could determine the x coordinate and y coordinate values of points (X-offset and Y-offset values), scale and angle variations between each characteristic symbols/key feature of the first feature and the second feature of the article, for example, a pharmaceutical product. The correction values are utilized by the processor 104 for detecting for identifying and authenticating a counterfeit article.

could determine the x coordinate and y coordinate values of points (X-offset and Y-offset values), scale and angle variations could determine the x coordinate and y coordinate values of points (X-offset and Y-offset values), scale and angle variations Referring to FIG. 18, a screenshot 1800 of a first feature group of the article is disclosed. In one embodiment, the first feature group is a digital twin, which could be extracted from the database 108 of the system 100. In one embodiment, the database 108 securely stores the actual original images, features, and additional information includes, but not limited to, air pressure, light conditions, position, distance and motive, date of production, country of origin, global trade identifier, batch number, serial number, etc. of the articles as a digital twin. In one embodiment, the first feature group could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles. In an exemplary embodiment, the first feature group includes a set of characteristic symbols/key features with a randomized pattern of reference features/authentication features of the corresponding article.

Figure 19:
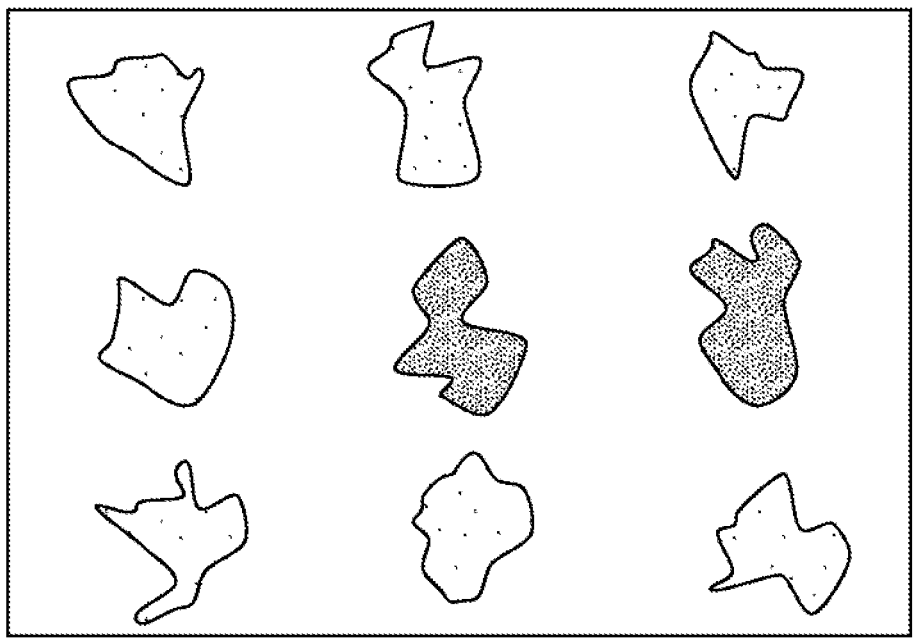
FIG. 19 shows a screenshot of a second feature group of the article in yet another embodiment of the present invention.

Referring to FIG. 19, a screenshot 1900 of a second feature group of the article is disclosed. In one embodiment, the second feature group of the article could be extracted from the one or more images taken by the user using the portable electronic device 118, for example, a smart phone. In one embodiment, the article to be authenticated and it could be, but not limited to, packages, pharmaceutical drugs, automobile parts, electronic gadgets and products, pesticides, children's toys, and thereof. In one embodiment, the second feature group could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles. In an exemplary embodiment, the second feature group includes a set of characteristic symbols/key features with a randomized pattern of reference features/authentication features of the article.

Figure 20:
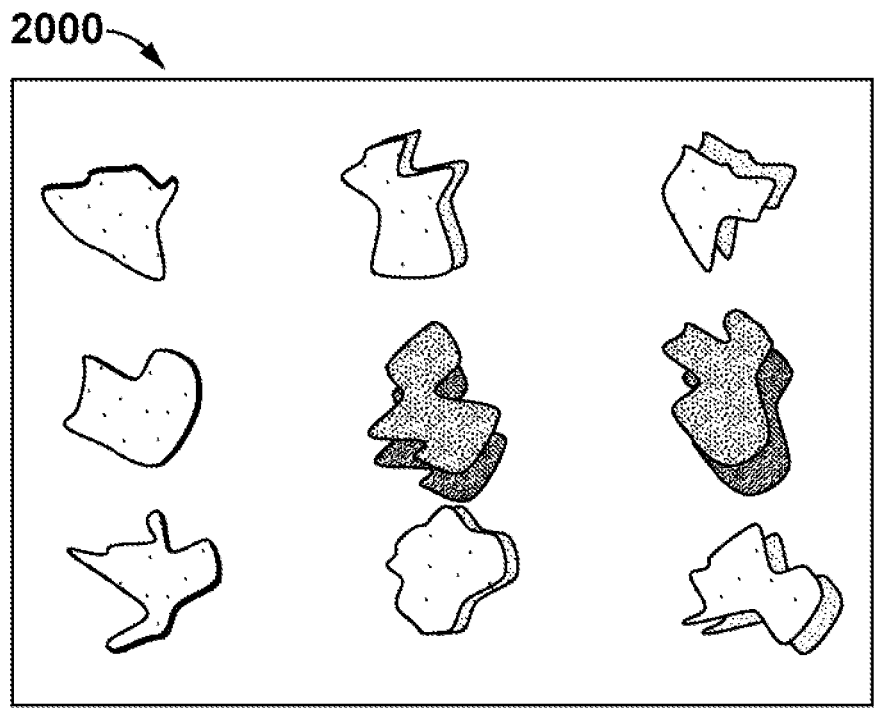
FIG. 20 shows a screenshot of the first feature group of the article overlapped on the second feature group for identifying and authenticating the counterfeit article in another embodiment of the present invention.

Referring to FIG. 20, the screenshot 2000 of the first feature group of the article is overlapped on the second feature group for identifying and authenticating the counterfeit article is disclosed. In one embodiment, the first feature group of the article is overlaid on the second feature group of the corresponding article. The first feature group could be the actual analog identification indicium. In one embodiment, the comparison module 112 of the system 100 is configured to compare the first feature group of the article with the second feature group by overlapping each other, thereby efficiently identifying and authenticating the counterfeit articles based on the comparison result and variations/deviations in the offset within the limits using the mathematical models. The set of characteristic symbols/key features of the first feature group and associated to the corresponding set of characteristic symbols/key features of the second feature group are overlapped for identifying and authenticating the counterfeit articles.

Figure 21:
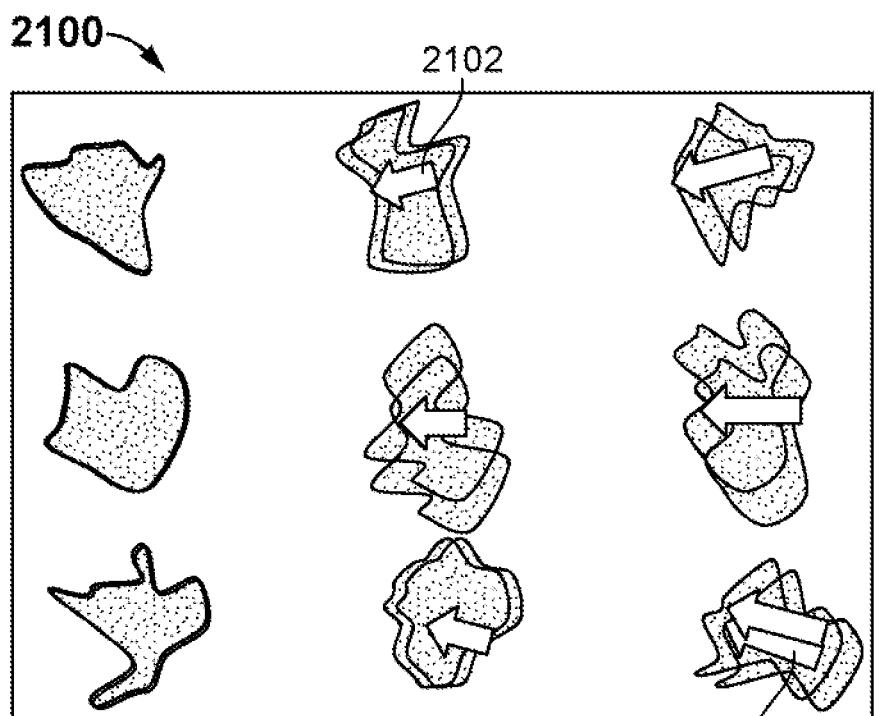
FIG. 21 shows a screenshot of the first feature group of the article overlapped on the second feature group with compensation vectors in another embodiment of the present invention.

Referring to FIG. 21, the screenshot 2100 of the first feature group of the article overlapped on the second feature group with compensation vectors 2102 is disclosed. In one embodiment, the compensation vectors 2102 could represent mismatch or dissimilarity of the characteristic symbols/key features of the first feature group associated to the corresponding set of the characteristic symbols/key features of the second feature group.

Figure 22:
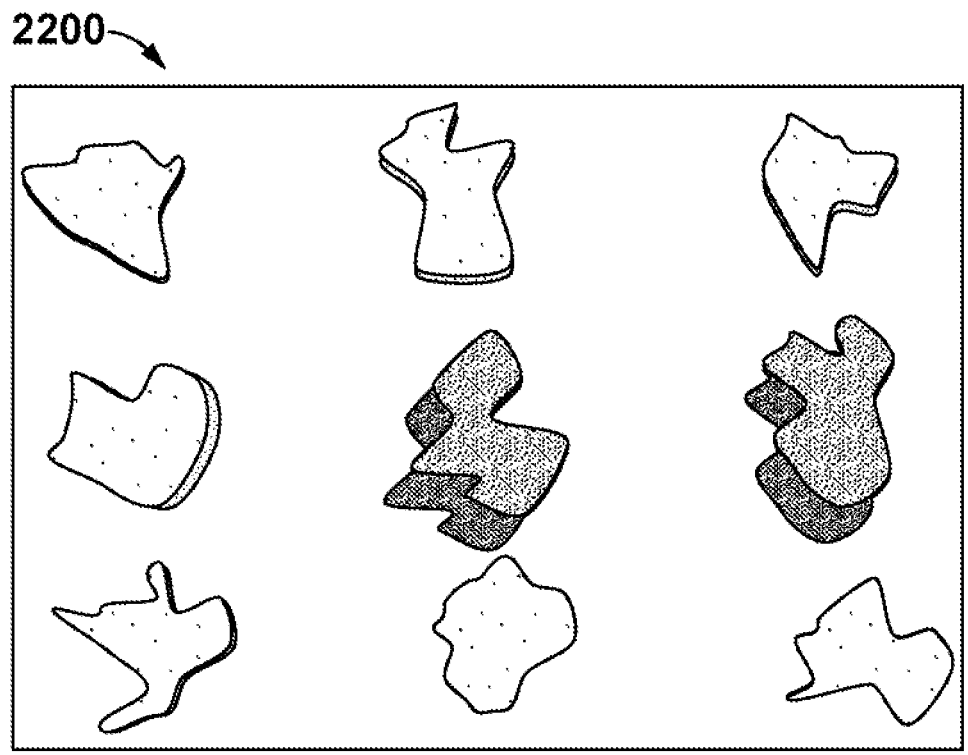
FIG. 22 shows a screenshot of the second feature group of the article compensated and overlapped on the first feature group of the article in another embodiment of the present invention.

Referring to FIG. 22, the screenshot 2200 of the second feature group of the article compensated and overlapped on the first feature group of the article is disclosed. In one embodiment, the second feature group of the article is compensated and overlapped on the first feature group for efficiently detecting and authenticating counterfeit articles.

Figure 23:
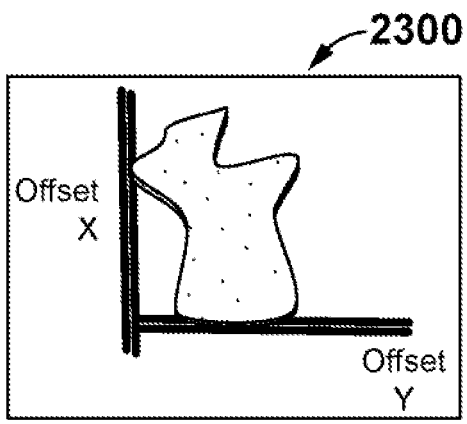
FIG. 23 shows a screenshot of the comparison results of at least one reference characteristic symbol/key feature of the first feature group and associated to the corresponding reference characteristic symbol/key feature of the second feature group of the article in another embodiment of the present invention.

Referring to FIG. 23, the screenshot 2300 of comparison results of at least one reference characteristic symbol/key feature of the first feature group and associated to the corresponding reference characteristic symbol/key feature of the second feature group of the article is disclosed. In one embodiment, the first feature group and the second feature group of the article are compared using the comparison module 112 of the system 100 with the mathematical models. In one embodiment, the first feature group and the second feature group could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles.

Figures 24A, 24B:
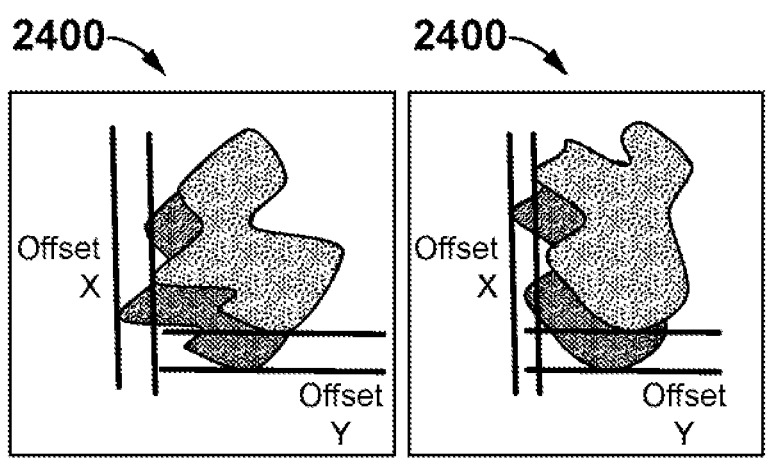
FIGS. 24A-24B, shows screenshots of comparison results of the authentication characteristic symbols/key features of the first feature group and associated to the corresponding authentication characteristic symbols/key features of the second feature group in another embodiment of the present invention.

Referring to FIGS. 24A-24B, the screenshots 2400 of comparison results of the authentication characteristic symbols/key features of the first feature group and associated to the corresponding authentication characteristic symbols/key features of the second feature group of the article are disclosed. In one embodiment, the system 100 could determine the x coordinate and y coordinate values of points (X-offset and Y-offset values), scale and angle variations between each authentication characterize symbol/key feature of the first feature group and the second feature group using the mathematical models, thereby efficiently identifying and authorizing the counterfeit articles using the system 100.

Figure 25:
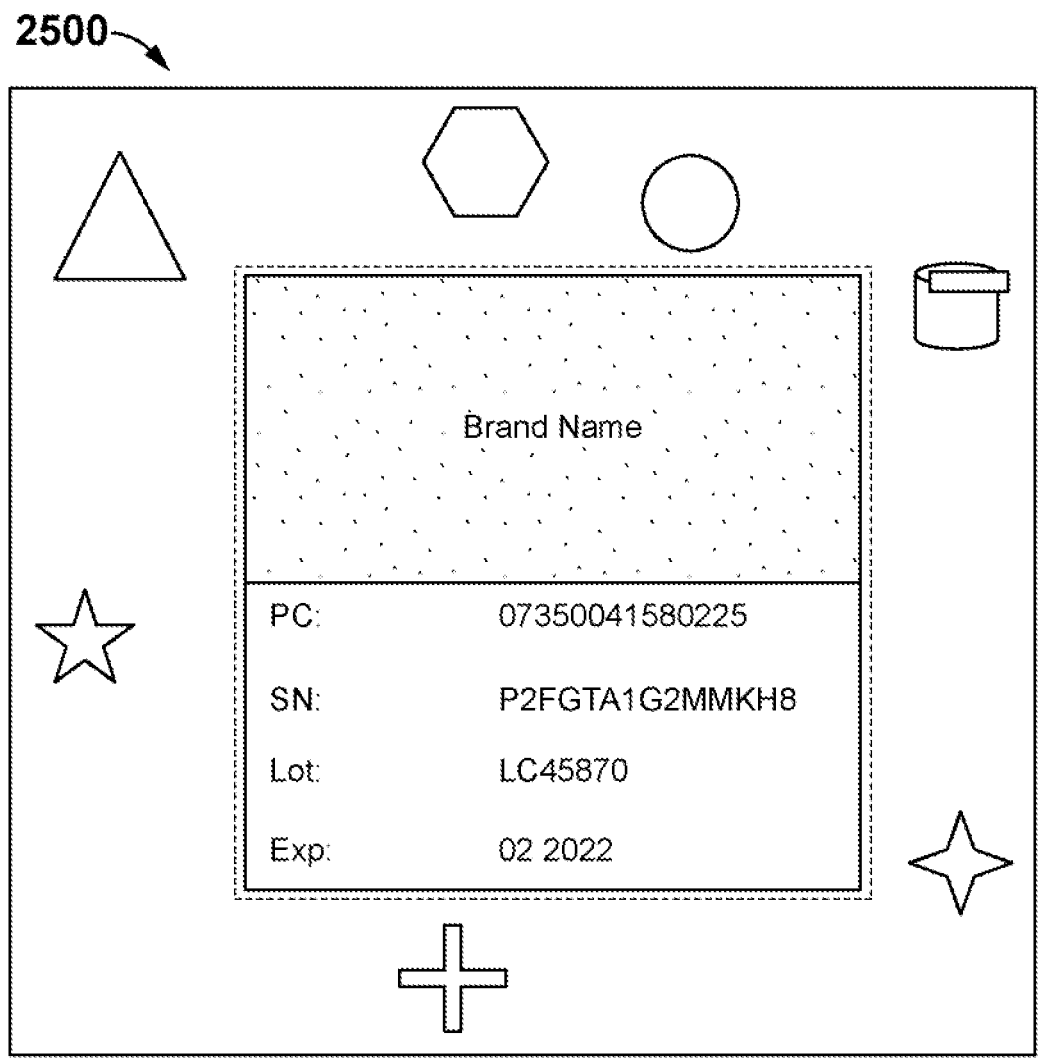
FIG. 25, shows a screenshot of an outline of the article, for example, a pharmaceutical drug in another embodiment of the present invention.

Referring to FIG. 25, the screenshot 2500 of an outline of the article, for example, a pharmaceutical drug is disclosed. In one embodiment, the digital image acquisition module 110 could determine the outlines of the product or item, for example, a pharmaceutical drug and crop the images. In one embodiment, the article could be, but not limited to, packages, pharmaceutical drugs, automobile parts, electronic gadgets and products, pesticides, children's toys, and thereof.

Figure 26:
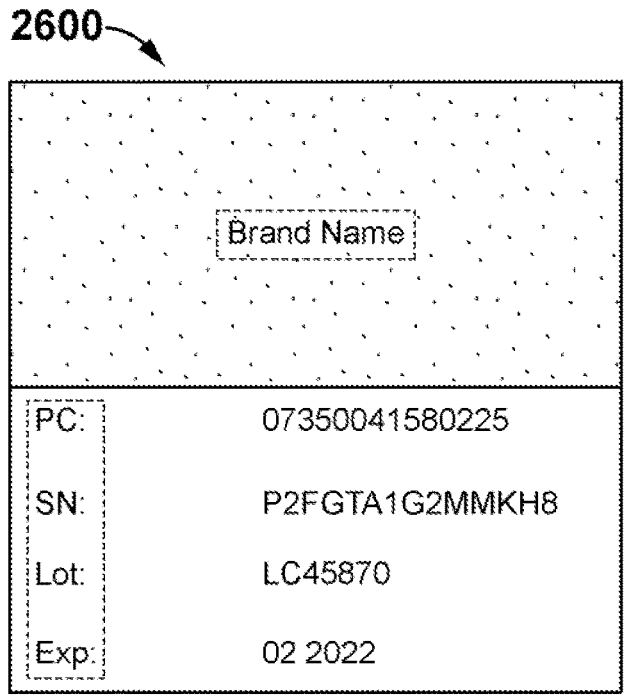
FIG. 26, the screenshot of reference features of an article, for example, a pharmaceutical drug in another embodiment of the present invention.

Referring to FIG. 26, the screenshot 2600 of reference features of an article, for example, a pharmaceutical drug is disclosed. In one embodiment, the reference features of the article could be extracted from the database 108 of the system 100. In one embodiment, the database 108 securely stores the actual original images, features, and addition al information of the articles as a digital twin. In one embodiment, the reference features of the article could be at least any one of, but not limited to, labels, stickers, package corners, printings, text fields include, but not limited to, a brand name, a PC number, a serial number, a batch number, and expiring date, symbols, embossment, geometric feature, punched holes, surfaces, quick reader (QR) codes/data matrix codes (DMC)/zebra barcodes, corners, and angles.

Figure 27:
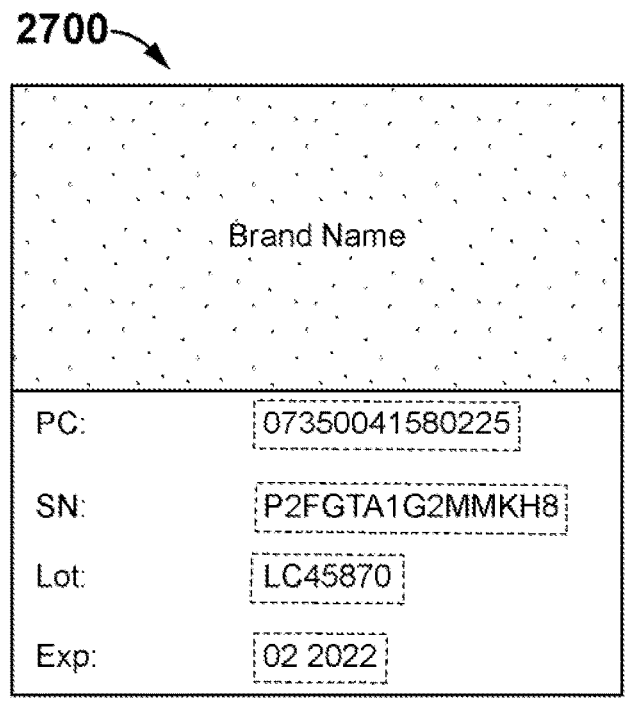
FIG. 27, the screenshot of authentication features of the article, for example, a pharmaceutical drug in another embodiment of the present invention.
Figure 28:
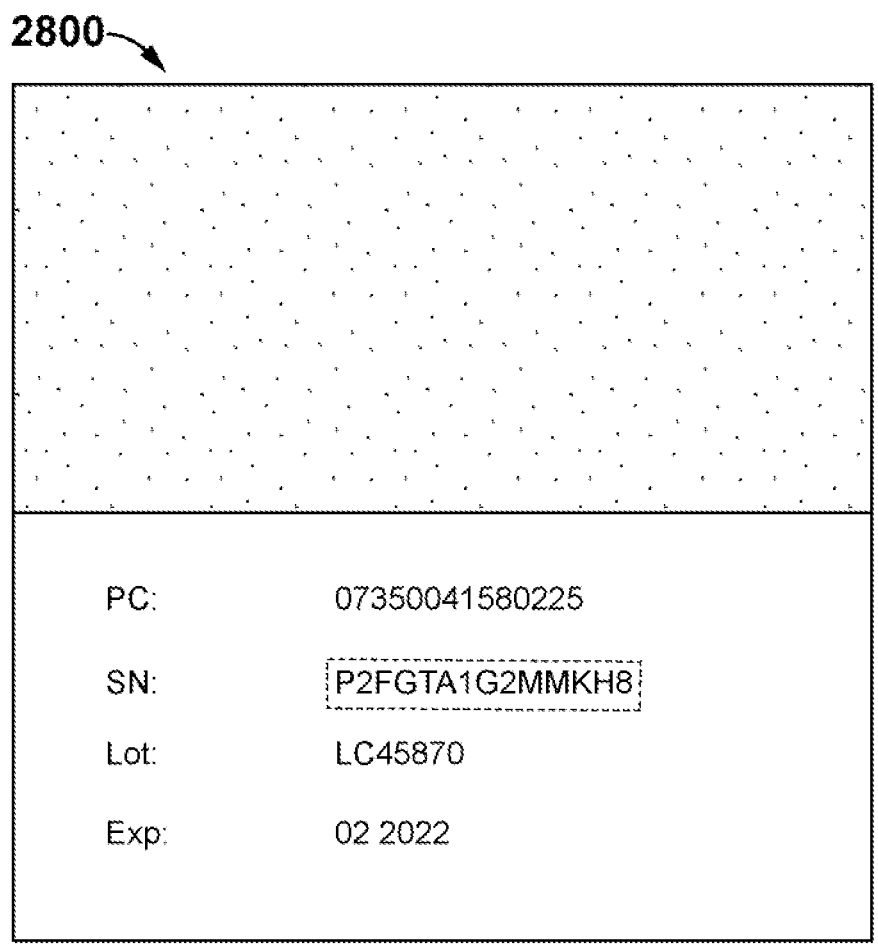
FIG. 28 a screenshot of the article, for example, a pharmaceutical drug with text fields in another embodiment of the present invention.

Referring to FIG. 27, the screenshot 2700 of authentication features of the article, for example, a pharmaceutical drug is disclosed. In one embodiment, the authentication features of the article could be at least any one of, but not limited to, labels, stickers, package corners, printings, text fields, symbols, embossment, geometric feature, punched holes, surfaces, quick reader (QR) codes/data matrix codes (DMC)/zebra barcodes, corners, and angles. In an exemplary embodiment, the authentication features of the article, for example, a pharmaceutical drug could be text fields such as, but not limited to, a brand name, a PC number, a serial number, a batch number, and expiring date. In one embodiment, the reference features of the article could be compared with the authentication features for accurately authenticating the article, for example, a pharmaceutical drug. Referring to FIG. 28, the screenshot 2800 of the article, for example, a pharmaceutical drug with text fields is disclosed. In an exemplary embodiment, the authentication features of the article, for example, a pharmaceutical drug could be text fields such as, but not limited to, a brand name, a PC number, a serial number, a batch number, and expiring date.

The advantages of the present invention include, the system 100 and method 200 are used for efficiently detecting and authenticating counterfeit articles. The system 100 is inexpensive and secure for efficiently detecting and authenticating counterfeit articles/goods. The anti-counterfeiting network verification system 116 of the system 100 securely protects the actual analog identification indicium of the articles from unauthorized access and other potential crimes. The anti-counterfeiting network verification system 116 simply and easily block the loophole-failure to resist a domestic thief of the existing anti-counterfeiting technologies. The user or customer could simply and efficiently identify and authenticate the counterfeit articles using the system 100 using a stationary or a portable electronic device 118, for example, a smart phone or a computer using a communication network, for example, a cellular network, or wired communication.

Although a single embodiment of the invention has been illustrated in the accompanying drawings and described in the above detailed description, it will be understood that the invention is not limited to the embodiment developed herein, but is capable of numerous rearrangements, modifications, substitutions of parts and elements without departing from the spirit and scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system for preparing an article for a digital fingerprint identification and authentication, the system comprising:
   a server including a processor and a memory in communication with the processor, wherein the memory stores a set of modules executable by the processor, wherein the server is configured to receive one or more images of the article via a communication network, the one or more images being captured by a portable electronic device;
   wherein the set of modules includes a digital image acquisition module configured to
     determine a region of interest on the captured one or more images,
     determine an outline of the article based on the region of interest, and
     crop the received one or more images based on the determined outline;
   a template database configured to store a template of the article comprising the cropped one or more images in preparation for the digital fingerprint identification and authentication of the article;

wherein the digital image acquisition module is further configured to create a digital twin of the article, the template database being configured to store the digital twin; and wherein creating the digital twin involves retrieving the template of the article from the template database, extracting a unique identification number or serial number of the article from the template, and creating the digital twin based on the unique identification number or serial number.

2. The system of claim 1, wherein the template comprises an array of regions of interest for localization of identification features, an array of regions of interest for localization of authentication features, and a region of interest for localization of a unique identifier or serial number.

3. The system of claim 1, wherein the digital image acquisition module is further configured to align the digital twin of the article with the article.

4. The system of claim 3, wherein aligning the digital twin of the article with the article comprises performing one of an image translation, a scaling or a rotation on either one of the digital twin of the article or the article.

5. The system of claim 3, wherein aligning the digital twin of the article with the article comprises performing a square image matching to identify misalignments between the digital twin of the article and the article.

6. The system of claim 1, wherein the digital image acquisition module is further configured to extract analog identification indicium of the article from the cropped one or more images, wherein the analog identification indicium comprises feature information and position information of one or more features of the article.

7. The system of claim 6, further comprising a database in communication with the server configured to store actual analog identification indicium of the article, digital identifier data, and digital identification record of the article;

wherein the actual analog identification indicium corresponding to the article is identified by reading and decoding digital identifier data and a digital identification record, the actual analog identification indicium including a randomized pattern of identification features of the article.

8. The system of claim 6, wherein the feature information of the analog identification indicium includes images, labels, stickers, package corners, printings, text fields, symbols, embossment, geometric feature, punched holes, surfaces, corners, quick reader (QR) codes, and angles.

9. The system of claim 7, wherein the set of modules further comprises:

a comparison module configured to compare the analog identification indicium with the actual analog identification indicium of the article by overlapping the feature information of the analog identification indicium with the randomized pattern of identification features of the actual analog identification indicium, wherein the overlapping involves calculating offsets between the feature information of the analog identification indicium and the randomized pattern of identification features of the actual analog identification indicium; and a decision module configured to determine the authenticity of the article based on the calculated offsets, the digital fingerprint identification and authentication of the article thereby being performed.

10. The system of claim 7, further comprising an anti-counterfeiting network verification system in communication with the server configured to securely protect the actual analog identification indicium of the article from unauthorized access and other potential crimes.

11. The system of claim 9, wherein the comparison module comprises mathematical models for efficiently authenticating the counterfeit article.

12. The system of claim 1, wherein the portable electronic device is one of a smart phone, a personal digital assistant (PDA), a notebook, a laptop, a tablet, or a remote controlling device.

13. The system of claim 1, wherein the portable electronic device is configured to send the one or more images to the server via the communication network based on one of Wi-Fi, Bluetooth®, a wireless local area network (WLAN), a cellular network, or radio communication.

14. A method for preparing an article for a digital fingerprint identification and authentication, the method comprising:

storing, by a server including a processor and a memory in communication with the processor, a set of modules executable by the processor;

receiving, by the server, one or more images of the article via a communication network, the one or more images being captured by a portable electronic device;

determining, by a digital acquisition module of the set of modules, a region of interest on the received one or more images;

determining, by the digital acquisition module, an outline of the article based on the region of interest;

cropping, by the digital acquisition module, the captured one or more images based on the determined outline;

storing, by a template database, a template of the article comprising the cropped one or more images in preparation for the digital fingerprint identification and authentication of the article;

creating, by the digital image acquisition module, a digital twin of the article, and storing the digital twin in the template database; and wherein creating the digital twin involves retrieving the template of the article from the template database, extracting a unique identification number or serial number of the article from the template, and creating the digital twin based on the unique identification number or serial number.

15. A system for preparing an article for a digital fingerprint identification and authentication, the system comprising:

a server including a processor and a memory in communication with the processor, wherein the memory stores a set of modules executable by the processor, wherein the server is configured to receive one or more images of the article via a communication network, the one or more images being captured by a portable electronic device;

wherein the set of modules includes a digital image acquisition module configured to
  determine a region of interest on the captured one or more images,
  determine an outline of the article based on the region of interest, and
  crop the received one or more images based on the determined outline;

a template database configured to store a template of the article comprising the cropped one or more images in preparation for the digital fingerprint identification and authentication of the article;

wherein the digital image acquisition module is further configured to extract analog identification indicium of the article from the cropped one or more images, wherein the analog identification indicium includes feature information and position information of one or more features of the article;
a database in communication with the server configured to store actual analog identification indicium of the article, digital identifier data, and digital identification record of the article;
wherein the actual analog identification indicium corresponding to the article is identified by reading and decoding digital identifier data and a digital identification record, the actual analog identification indicium including a randomized pattern of identification features of the article;
wherein the set of modules further includes a comparison module configured to compare the analog identification indicium with the actual analog identification indicium of the article by overlapping the feature information of the analog identification indicium with the randomized pattern of identification features of the actual analog identification indicium, wherein the overlapping involves calculating offsets between the feature information of the analog identification indicium and the randomized pattern of identification features of the actual analog identification indicium; and
wherein the set of modules further includes a decision module configured to determine the authenticity of the article based on the calculated offsets, the digital fingerprint identification and authentication of the article thereby being performed.

16. A method for preparing an article for a digital fingerprint identification and authentication, the method comprising:
storing, by a server including a processor and a memory in communication with the processor, a set of modules executable by the processor;
receiving, by the server, one or more images of the article via a communication network, the one or more images being captured by a portable electronic device;
determining, by a digital acquisition module of the set of modules, a region of interest on the received one or more images;
determining, by the digital acquisition module, an outline of the article based on the region of interest;
cropping, by the digital acquisition module, the captured one or more images based on the determined outline; and
storing, by a template database, a template of the article comprising the cropped one or more images in preparation for the digital fingerprint identification and authentication of the article;
extracting, by the digital image acquisition module, analog identification indicium of the article from the cropped one or more images, wherein the analog identification indicium includes feature information and position information of one or more features of the article;
storing, by a database in communication with the server, actual analog identification indicium of the article, digital identifier data, and digital identification record of the article;
wherein the actual analog identification indicium corresponding to the article is identified by reading and decoding digital identifier data and a digital identification record, the actual analog identification indicium including a randomized pattern of identification features of the article;
comparing, by a comparison module of the set of modules, the analog identification indicium with the actual analog identification indicium of the article by overlapping the feature information of the analog identification indicium with the randomized pattern of identification features of the actual analog identification indicium, wherein the overlapping involves calculating offsets between the feature information of the analog identification indicium and the randomized pattern of identification features of the actual analog identification indicium; and
determining, by a decision module of the set of modules, the authenticity of the article based on the calculated offsets, the digital fingerprint identification and authentication of the article thereby being performed.

* * * * *